(12) United States Patent
Adachi et al.

(10) Patent No.: US 9,046,949 B2
(45) Date of Patent: Jun. 2, 2015

(54) ELECTRONIC DEVICE

(71) Applicant: Panasonic Corporation, Osaka (JP)

(72) Inventors: Yusuke Adachi, Osaka (JP); Masahiro Inata, Hyogo (JP); Ryo Okumura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/109,514

(22) Filed: Dec. 17, 2013

(65) Prior Publication Data

US 2014/0104216 A1    Apr. 17, 2014

Related U.S. Application Data

(63) Continuation of application No. PCT/JP2013/000512, filed on Jan. 31, 2013.

(30) Foreign Application Priority Data

Oct. 12, 2012  (JP) .................. 2012-226583

(51) Int. Cl.
*G06F 3/041*   (2006.01)
*G06F 3/01*    (2006.01)

(52) U.S. Cl.
CPC ............... *G06F 3/041* (2013.01); *G06F 3/016* (2013.01)

(58) Field of Classification Search
CPC ................................. G06F 3/016; G06F 3/041
USPC ........ 345/173–178; 178/18.01–18.09; 349/12
See application file for complete search history.

(56) References Cited

U.S. PATENT DOCUMENTS

| 2005/0174336 A1 | 8/2005 | Nakayama et al. |
| 2006/0146032 A1 | 7/2006 | Kajimoto et al. |
| 2010/0225600 A1* | 9/2010 | Dai et al. .................. 345/173 |
| 2011/0050598 A1* | 3/2011 | Park et al. .................. 345/173 |

FOREIGN PATENT DOCUMENTS

| CN | 101369184 A | 2/2009 |
| EP | 2026174 A1 | 8/2007 |
| JP | 2003-271074 A | 9/2003 |
| JP | 2004-272651 A | 9/2004 |
| JP | 2005-222326 A | 8/2005 |

(Continued)

OTHER PUBLICATIONS

Search Report for corresponding Chinese Application No. 201380001866.8, dated Jul. 25, 2014.

(Continued)

*Primary Examiner* — Jimmy H Nguyen
(74) *Attorney, Agent, or Firm* — Renner, Otto, Boisselle & Sklar, LLP

(57) ABSTRACT

An electronic device 100 includes a display unit 165 including a display part 160 having a display region 160a on which to display an image, a panel member 130 to be touched by a user, and a first adhesive part 150 which is provided so as to cover the display region 160a and which bonds the panel member 130 and the display part 160 together; a vibration part 140 which causes flexural vibration of the display unit 165; and a second adhesive part 155 which bonds the vibration part to the display unit. The rigidity of the first adhesive part 150 is lower than the rigidity of the second adhesive part 155.

10 Claims, 10 Drawing Sheets

(56) References Cited

FOREIGN PATENT DOCUMENTS

| | | |
|---|---|---|
| JP | 2006-001498 A | 1/2006 |
| JP | 2006-155447 A | 6/2006 |
| JP | 2009-110248 A | 5/2009 |
| JP | 2011-175518 A | 9/2011 |
| WO | WO 2012/111349 A | 8/2012 |

OTHER PUBLICATIONS

International Search Report for corresponding International Application No. PCT/JP2013/000512, mailed May 14, 2013.

Written Opinion for corresponding International Application No. PCT/JP2013/000512, dated May 14, 2013, with English translation.

* cited by examiner

ELECTRONIC DEVICE

BACKGROUND

1. Field

The present disclosure relates to electronic devices that generate vibration in accordance with a touch operation performed by a user, for example.

2. Description of the Related Art

Patent Literature 1 discloses a device which provides a user with tactile sensation by generating vibration on a touch panel by applying a voltage to a piezoelectric element fixed to the touch panel. Accordingly, the user can obtain a feeling of performing an input operation.

Patent Literature 1: Japanese Laid-Open Patent Publication No. 2005-222326

SUMMARY

The present disclosure provides an electronic device that is highly reliable with reduced uneven luminance and reduced uneven color, and that can present tactile sensation in accordance with a touch operation performed by a user.

An electronic device in the present disclosure includes: a display unit including a display part having a display region on which to display an image, a panel member to be touched by a user, and a first adhesive part provided so as to cover the display region and bonding the panel member and the display part together; a vibration part configured to cause flexural vibration of the display unit; and a second adhesive part bonding the vibration part to the display unit. In the electronic device, rigidity of the first adhesive part is lower than rigidity of the second adhesive part.

The electronic device in the present disclosure is highly reliable with reduced uneven luminance and reduced uneven color, and can present appropriate tactile sensation in accordance with a touch operation performed by the user.

DETAILED DESCRIPTION

Hereinafter, embodiments will be described with reference to the drawings as appropriate. However, there will be instances in which detailed description beyond what is necessary is omitted. For example, detailed description of subject matter that is previously well-known, as well as redundant description of components that are substantially the same will in some cases be omitted. This is to prevent the following description from being unnecessarily lengthy, in order to facilitate understanding by a person of ordinary skill in the art.

The inventors provide the following description and the accompanying drawings in order to allow a person of ordinary skill in the art to sufficiently understand the present disclosure, and the description and the drawings are not intended to restrict the subject matter of the scope of the patent claims.

Embodiment 1

Hereinafter, embodiment 1 will be described with reference to FIGS. 1 to 6.

Figure 1:
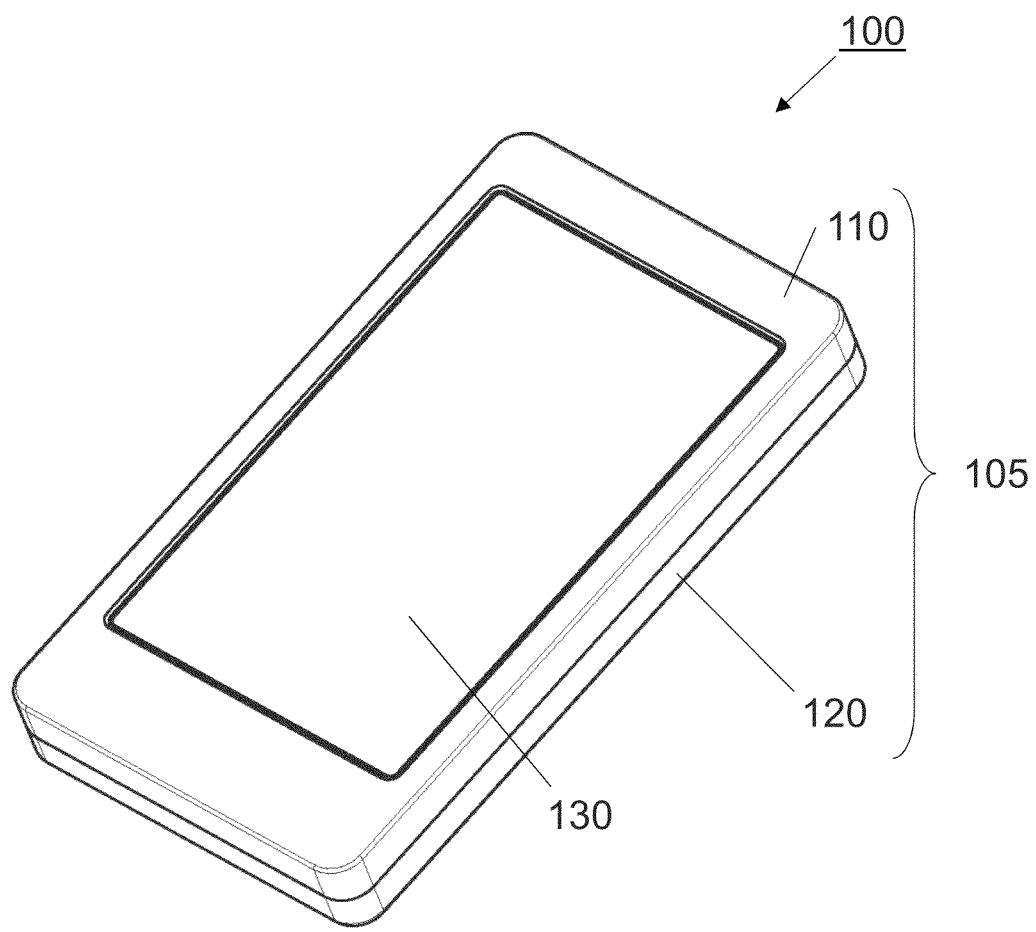
FIG. 1 is a perspective view showing an overall structure of an electronic device of embodiment 1.

FIG. 1 is a perspective view showing an overall structure of an electronic device 100 of the present embodiment. The electronic device 100 includes an upper housing 110, a lower housing 120, and a touch panel 130. The upper housing 110 and the lower housing 120 are integrally coupled with each other with screws or the like, thereby forming a housing 105 of the electronic device 100.

Figure 2:
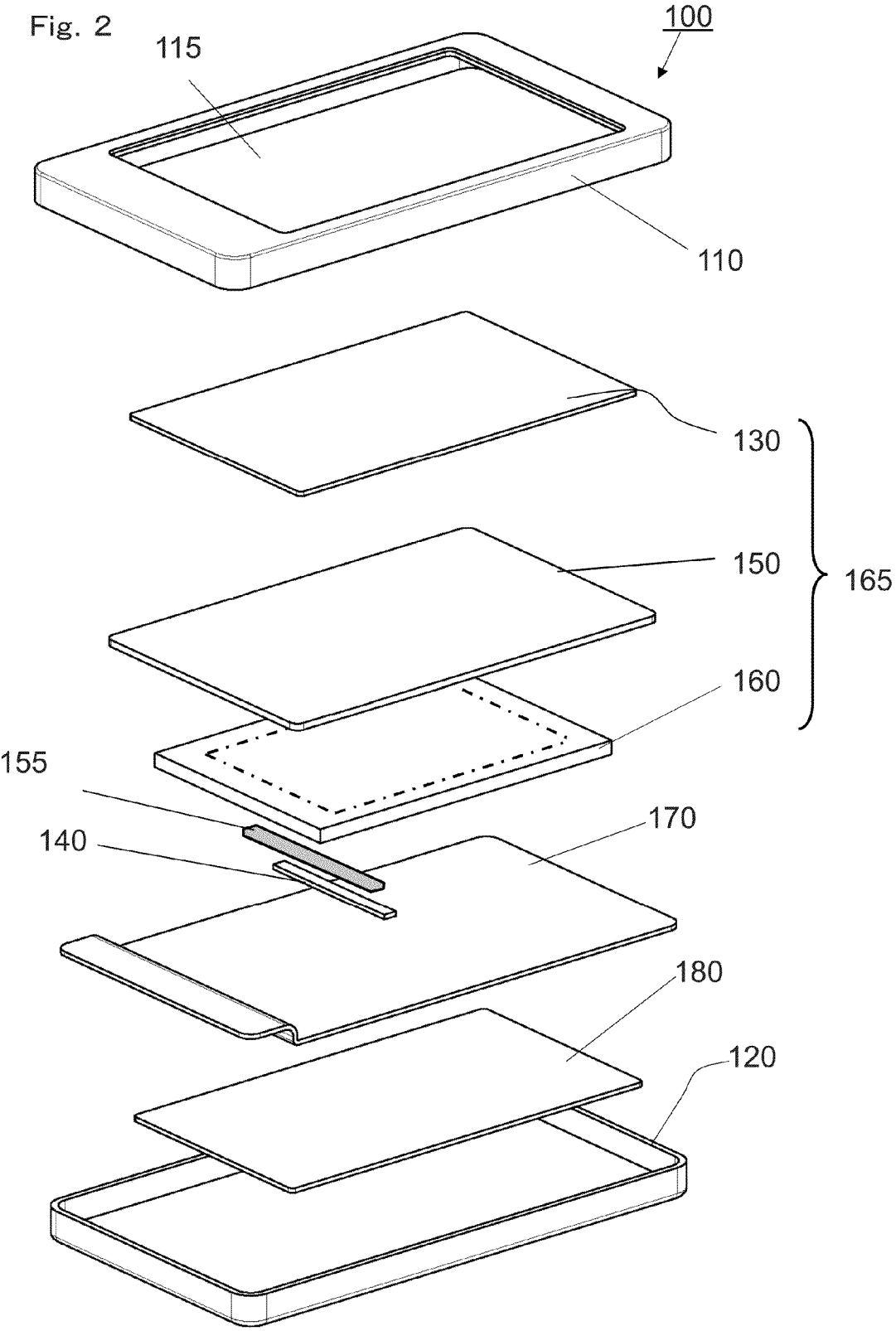
FIG. 2 is an exploded perspective view of the electronic device of embodiment 1.

FIG. 2 is an exploded perspective view of the electronic device of the present embodiment. The electronic device 100 includes a display panel 160, the touch panel 130 arranged so as to cover the display panel 160, and a first adhesive part 150 (adhesive layer) which bonds the touch panel 130 and the display panel 160 together. The first adhesive part 150 is an example of an adhesive part. A vibration part 140 is bonded to the display panel 160 by means of a second adhesive part 155, and causes a display unit 165 to vibrate. In FIG. 2, the first adhesive part 150 is shown as a plate-like sheet member for convenience, but the first adhesive part 150 may be a gel-like member. For example, the first adhesive part 150 is formed by: applying an adhesive on the rear face of the touch panel 130; overlaying the display panel 160 on the adhesive; and then curing the adhesive.

In the upper housing 110, a display window 115 is formed. The user can operate the touch panel 130 through the display window 115.

The touch panel 130 is arranged so as to face the display panel 160. The touch panel 130 is an example of a panel member to be touched by the user. The touch panel 130 is of an electrostatic type, a resistive film type, or an optical type.

A frame 170 supports a circuit board 180 and is fixed to the lower housing 120 with screws or the like. To the circuit board 180, the touch panel 130, the display panel 160, and the vibration part 140 electrically connected. The circuit board 180 is provided with a microcomputer 200.

In the present embodiment, the touch panel 130 is an externally-mounted touch panel separated from the display panel 160. However, the present disclosure is not limited thereto.

The touch panel 130 may be a built-in touch panel included in the display panel 160. For example, the touch panel 130 may be an in-cell touch panel or the like that has a touch panel function integrated inside the liquid crystal panel. Alternatively, the touch panel 130 may be an on-cell touch panel. In the case of a built-in touch panel, instead of the touch panel 130, a mere protection panel that does not have a detecting function of a touch position will serve as a panel member to be touched by the user.

Figure 3:
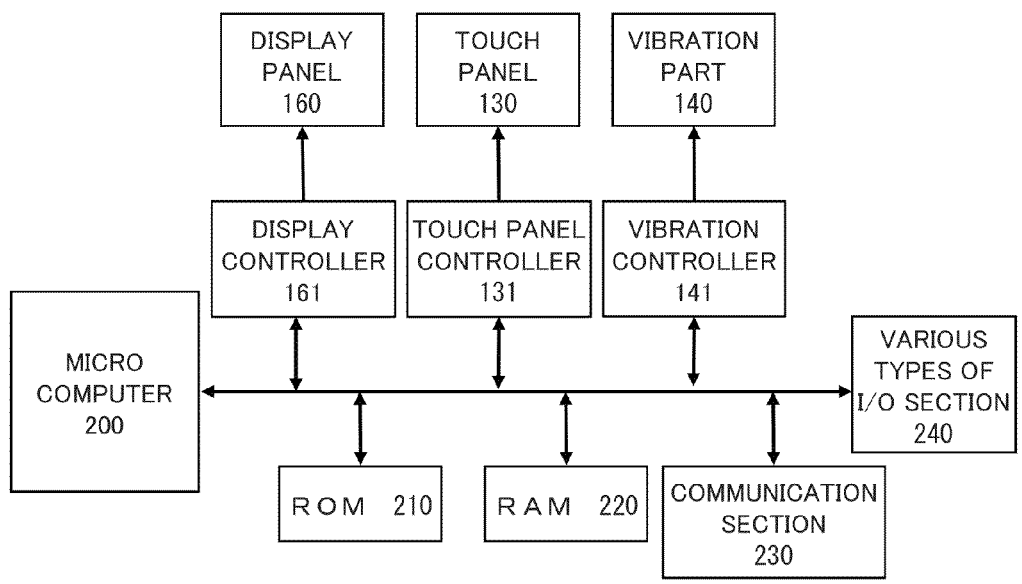
FIG. 3 is a block diagram of the electronic device of embodiment 1.

FIG. 3 is a block diagram of the electronic device 100 of the present embodiment. The electronic device 100 includes the touch panel 130, a touch panel controller 131, the vibration part 140, a vibration controller 141, the display panel 160, a display controller 161, the microcomputer 200, a ROM 210, a RAM 220, a communication section 230, and an I/O section 240. The microcomputer 200 is a unit that controls the entirety of the electronic device 100, and is connected to various controllers.

The touch panel controller 131 controls operation of the touch panel 130. The touch panel controller 131 can detect a touch position of the user. The microcomputer 200 can obtain information of the touch position of the user, via the touch panel controller 131. In a case where the touch panel 130 is of an electrostatic capacitance type, the touch panel controller 131 detects a change in electrostatic capacitance of the touch panel 130, and outputs, to the microcomputer 200, information of the position where the change has occurred, as touch position information. The vibration controller 141 receives the touch position information from the microcomputer 200, and uses information of the change in the touch position of the user and a time period of the touching being made by the user, to control vibration of the vibration part 140 in accordance with various input operations (touch operations) performed by the user.

The display panel 160 is a display panel such as a liquid crystal display, an organic EL display, electronic paper, a plasma display, or the like. The display panel 160 is controlled by the display controller 161. The microcomputer 200 causes, via the display controller 161, the display panel 160 to display a given image to be presented to the user.

The ROM 210 has various types of programs stored therein. The RAM 220 has various types of data stored therein. The display controller 161 prepares data to be rendered, and controls the display panel 160 so as to display an image based on that data. The I/O section 240 inputs/outputs various types of signals.

The communication section 230 is connected to a wireless LAN such as Wi-Fi (registered trademark), for example, with mutual connectivity among a plurality of electronic devices authenticated. For the connection among electronic devices, a scheme of establishing connection via an external communication device such as an access point, or a P2P (wireless ad hoc network) connection being a scheme of directly establishing connection not via an external communication device may be used.

The user performs a touch operation of touching the touch panel 130 using a finger or a pen with respect to the contents displayed on the display panel 160, thereby operating the electronic device 100. The display panel 160 is an example of a display part. The touch panel 130 is an example of a panel member to be touched by the user.

Figure 4:
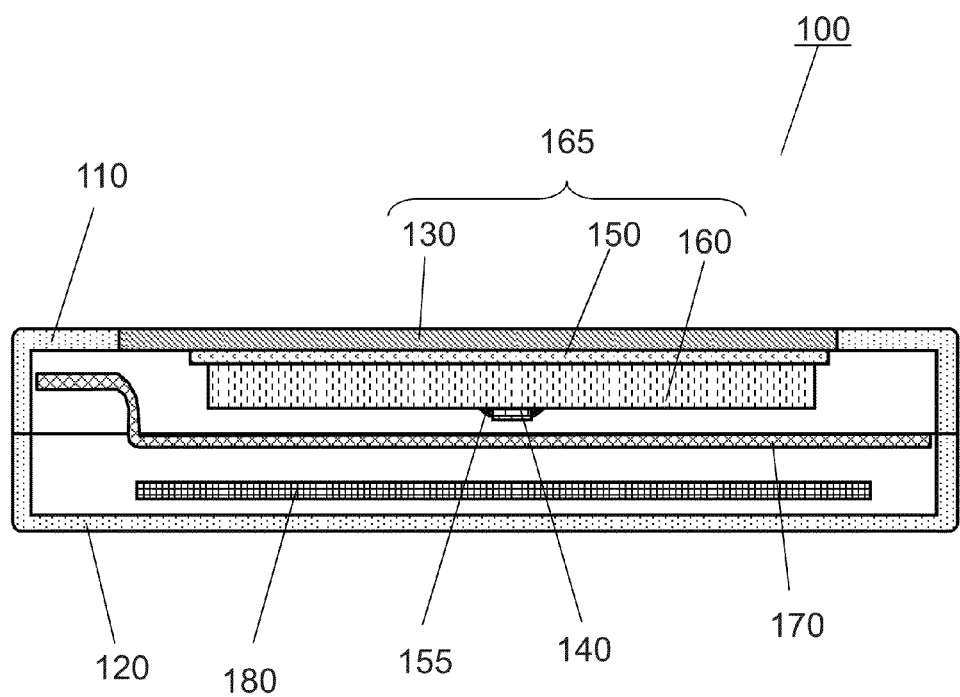
FIG. 4 is a cross-sectional view of the electronic device of embodiment 1.

FIG. 4 is a cross-sectional view of the electronic device 100 of the present embodiment.

The first adhesive part 150 (adhesive layer) bonds the touch panel 130 and the display panel 160 together, by a bonding method called optical bonding. Here, the display panel 160 includes a display surface 160a (display region) on which to display information such as characters and images. The first adhesive part 150 is formed so as to cover at least the entirety of the display surface 160a. In the present embodiment, the entire region of the front face (face on the touch panel 130 side) of the display panel 160 is covered with the first adhesive part 150, whereby the display panel 160 is affixed to the touch panel 130.

The first adhesive part 150 is formed by, for example, a baseless double-faced adhesive sheet, an optical elastomeric resin which cures under ultraviolet rays, or the like. For example, the rigidity (rigidity after the curing) of the first adhesive part 150 is lower than the rigidity of the touch panel 130. Accordingly, under the influence of cure shrinkage of the adhesive, it is possible to suppress occurrence of uneven luminance and uneven color caused by the display panel 160 receiving a stress caused by a stress occurring in the first adhesive part 150. Accordingly, reliability of the electronic device 100 is improved. Further, after the curing of the first adhesive part 150, the display panel 160 generates heat during operation. On the other hand, the display panel 160 and the touch panel 130 have thermal expansion coefficients different from each other. Thus, under the influence of the thermal expansions of the display panel 160 and the touch panel 130, as in the case of the cure shrinkage of the adhesive, it is possible to suppress occurrence of a stress. Further, the first adhesive part 150 is formed from an optically transparent material that allows light emitted from the display panel 160 pass therethrough. Accordingly, information such as characters and images displayed on the display panel 160 can be viewed by the user.

The display unit 165 includes the touch panel 130, the display panel 160, and the first adhesive part 150 which bonds the touch panel 130 and the display panel 160 together. The vibration part 140 is attached to the rear face (a face of the display panel 160 opposite to the face thereof facing the touch panel 130) of the display panel 160, via the second adhesive part 155 (for example, adhesive).

The vibration part 140 causes the entirety of the display unit 165 to vibrate. As the vibration part 140, from the viewpoint of responsiveness and the size, a piezoelectric element is used, for example. The vibration part 140 being a piezoelectric body expands and contracts when a voltage is applied thereto by the vibration controller 141. However, even though the vibration part 140 expands and contracts, the display unit 165 does not expand or contract by the expanding/contracting force of the piezoelectric body. As a result, due to the expanding/contracting force of the piezoelectric body, flexural vibration occurs in the display unit 165. By applying, to the vibration part 140, a drive voltage having a frequency appropriate for the display unit 165, the display unit 165 resonates, whereby a large vibration can be obtained by use of a small power.

The second adhesive part 155 is an epoxy resin, an acrylic resin, a urethane resin, or the like. The rigidity (value after curing) of the second adhesive part 155 is set to be higher than that of the rigidity (value after curing) of the first adhesive part 150. For example, in a case where rigidity is evaluated in terms of Young's modulus, the Young's modulus of the second adhesive part 155 is greater than the Young's modulus of the first adhesive part 150. Accordingly, while the force from the vibration part 140 is efficiently transferred to the display unit 165, occurrence of uneven luminance and uneven color in the display panel 160 can be suppressed. For example, the rigidity (Young's modulus) of the first adhesive part 150 is smaller than or equal to a half of the rigidity (Young's modulus) of the second adhesive part 155. The Young's modulus of the second adhesive part 155 is 2 GPa, for example.

The bonding area of the first adhesive part 150 is greater than the bonding area of the second adhesive part 155. Therefore, even when the rigidity of the first adhesive part 150 is set to be lower than the rigidity of the second adhesive part 155, vibration transferred to the display panel 160 can be transmitted to the entirety of the display unit 165, via the first adhesive part 150.

There is another object in setting the rigidity of the second adhesive part 155 to be higher than the rigidity of the first adhesive part 150. When causing flexural vibration of the display unit 165 which integrally includes the touch panel 130 and the display panel 160, a large stress occurs in the first adhesive part 150 positioned at a center portion in the thickness direction of the display unit 165. Here, a required condition for the first adhesive part 150 is being transparent. Accordingly, the breaking strength of the first adhesive part 150 is lower than the breaking strength of the touch panel 130 and the breaking strength of the display panel 160, and thus, the first adhesive part 150 may break under a flexural stress. In contrast, in the present embodiment, the rigidity of the second adhesive part 155 is set to be higher than the rigidity of the first adhesive part 150, whereby the stress to the second adhesive part 155 is alleviated, and thus, the reliability is improved.

As described above, by setting the rigidity of the second adhesive part 155 to be higher than the rigidity of the first adhesive part 150, uneven luminance and uneven color in the electronic device 100 are reduced, high reliability is maintained while the entirety of the display unit 165 is caused to vibrate, and appropriate tactile sensation in accordance with a touch operation can be presented to the user.

It should be noted that the vibration part 140 is not limited to a piezoelectric element, and may be any member that can convert electrical energy into vibration energy, such as a linear actuator, a voice coil motor, an artificial muscle, or the like, and that has a desired properties and size.

The frequency, amplitude, and period of vibration when tactile sensation is presented upon operation of the touch panel 130 are controlled by the vibration controller 141. As the frequency of the vibration, a frequency of about 100 to 400 Hz which easily allows a person to feel tactile sensation can be used, for example.

Figure 5:
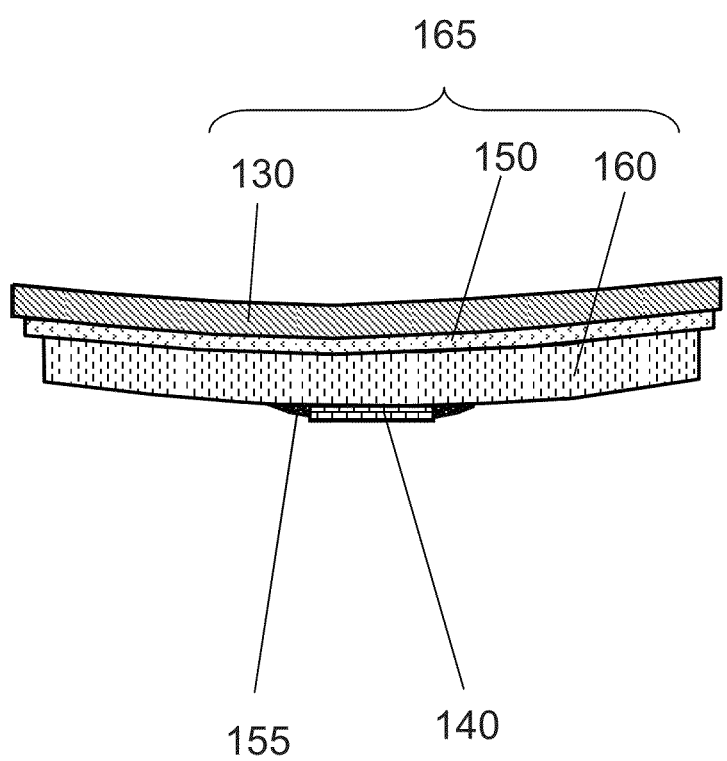
FIG. 5 is a cross-sectional view of a display unit of embodiment 1 being in vibration.

FIG. 5 is a cross-sectional view of the display unit 165 of the present embodiment being in vibration. FIG. 5 is a cross-sectional view of the display unit 165, viewed in the extending direction of the piezoelectric part 140 having a narrow plate-like shape. FIG. 5 shows a state where the display unit 165 is in vibration in a basic mode being a resonance mode in which the resonance frequency is lowest. In a middle portion of the display unit 165, a large vibration has been obtained. In end portions of the display unit 165, the vibration is not so large.

Figure 6:
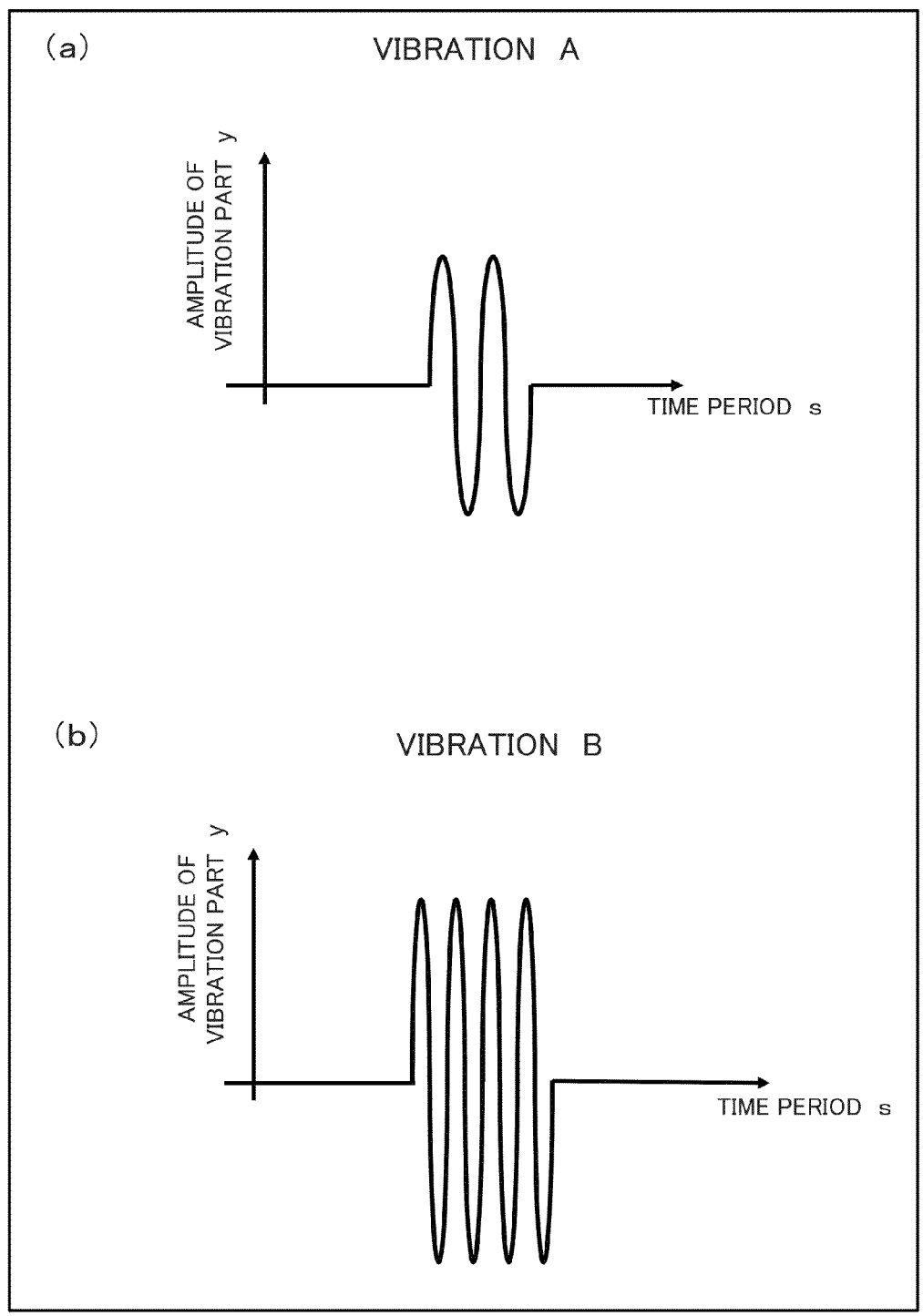
FIG. 6(a) is a schematic diagram showing an example of a vibration pattern of a vibration part of embodiment 1.
FIG. 6(b) is a schematic diagram showing another example of a vibration pattern of the vibration part of embodiment 1.

FIG. 6 is a schematic diagram showing examples of vibration patterns of the vibration part 140.

Upon receiving an instruction from the microcomputer 200, the vibration controller 141 applies a drive voltage to the vibration part 140, and causes the vibration part 140 to vibrate at the amplitude shown in (a) of FIG. 6, thereby causing the touch panel 130 to vibrate. As a result, vibration A is provided to the user. The drive voltage for providing the vibration A is in a sine wave, and for example, the frequency is 150 Hz, the root mean square value is 70 Vrms, and the applying period is 2 periods. The amplitude on the touch panel 130 is about 5 μm. Meanwhile, the vibration controller 141 applies a drive voltage to the vibration part 140, and causes the vibration part 140 to vibrate at the amplitude shown in (b) of FIG. 6, thereby causing the touch panel 130 to vibrate. Accordingly, vibration B is provided to the user. The drive voltage for providing the vibration B is in a sine wave, and for example, the frequency is 300 Hz, the root mean square value is 100 Vrms, and the applying period is 4 periods.

It should be noted that the frequency, the voltage value (root mean square value), the applying period are examples. The waveform of the drive voltage may be another waveform, such as a rectangular waveform, a saw tooth waveform, or the like, or alternatively, an intermittent waveform, or still alternatively, a waveform in which frequency and/or amplitude continuously change, or the like. Further, the magnitude of the amplitude on the touch panel 130 is an example, and the magnitude of the amplitude also changes depending on the conditions of the size or the supporting manner of the touch panel 130 and the display panel 160, the material or the shape of the first adhesive part 150, the number of the vibration part 140, and the like.

<Effects>

As described above, in the present embodiment, the electronic device 100 includes: the display unit 165 including the display panel 160 having the display surface 160a on which to display an image, the touch panel 130 to be touched by the user, and the first adhesive part 150 which is formed so as to cover the display surface 160a and which bonds the touch panel 130 and the display panel 160 together; the vibration part 140 which causes flexural vibration of the display unit 165; and the second adhesive part 155 which bonds the vibration part 140 to the display unit 165, and the rigidity of the first adhesive part 150 is lower than the rigidity of the second adhesive part 155.

Accordingly, vibration of the vibration part 140 can be efficiently transmitted to the display unit 165, and the stress within the display unit 165 can be alleviated. Therefore, it is possible to provide an electronic device that is highly reliable with reduced uneven luminance and reduced uneven color, and that can present appropriate tactile sensation in accordance with a touch operation performed by the user.

In the present embodiment, the first adhesive part 150 bonds the touch panel 130 and the display panel 160 together, for substantially the entirety of the region where the touch panel 130 and the display panel 160 face each other.

Accordingly, the integration of the touch panel 130 and the display panel 160 is enhanced, and reflection of outside light is reduced. Thus, even under strong outside light (outdoors, brightly illuminated indoors, and the like), visibility of the display panel 160 is improved.

In the present embodiment, the rigidity of the first adhesive part 150 is lower than the rigidity of the touch panel 130.

Accordingly, through deformation of the first adhesive part 150, pressure caused by the touch performed by the user is less likely to be transferred to the display panel 160. As a result, uneven luminance and uneven color on the screen caused by uneven stress due to the touch by the user can be prevented.

In the present embodiment, the vibration part 140 is bonded to the display panel 160, on the opposite side to the touch panel 130.

This reduces the mounting area for the vibration part 140. Accordingly, the electronic device 100 can be downsized.

In the present embodiment, the first adhesive part 150 is formed from a material that allows light emitted from the display panel 160 pass therethrough.

This reduces reflection of outside light. Accordingly, even under strong outside light (outdoors, brightly illuminated indoors, and the like), visibility of the display panel 160 is improved.

Embodiment 2

Next, an electronic device 300 according to embodiment 2 will be described. The electronic device 300 according to the present embodiment is different from that of embodiment 1, in the positions at which the vibration parts 140 are bonded. Hereinafter, the difference will be described.

Figure 7:
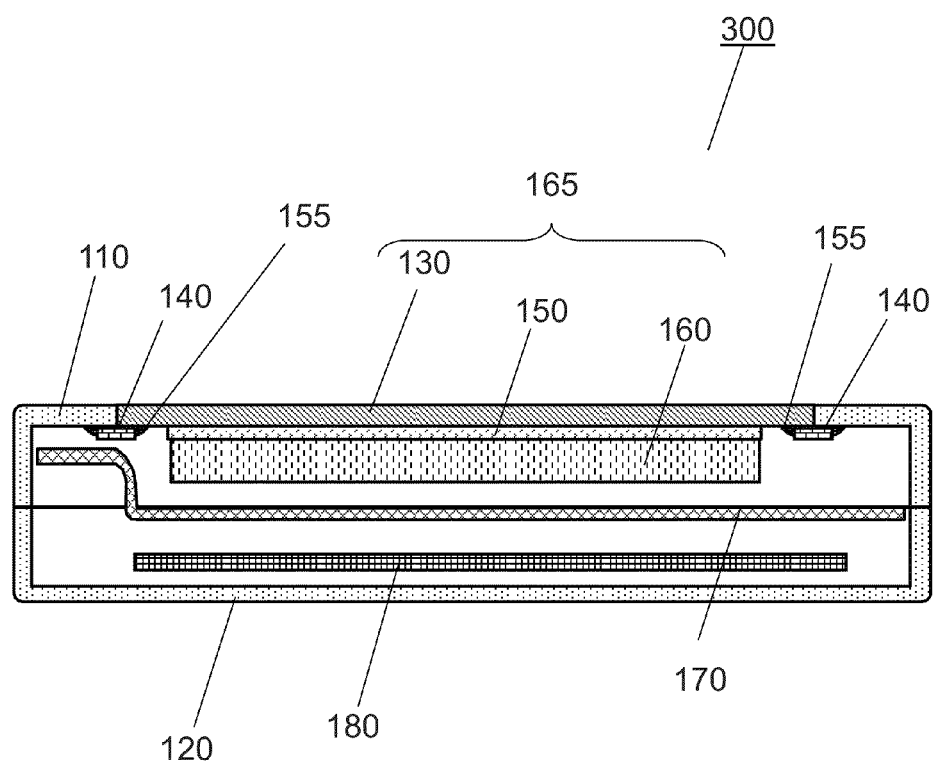
FIG. 7 is a cross-sectional view of an electronic device of embodiment 2.

FIG. 7 is a cross-sectional view of the electronic device 300 in the present embodiment. As shown in FIG. 7, each vibration part 140 is bonded to the touch panel 130 via the second adhesive part 155. Accordingly, vibration of the vibration parts 140 are transmitted to the touch panel 130, thereby being able to cause the entirety of the display unit 165 to vibrate via the first adhesive part 150. Compared with embodiment 1, since the vibration parts 140 are not laid on the display unit 165 in the thickness direction of the display unit 165 (the touch panel 130, the first adhesive part 150, the display panel 160), the thickness of the electronic device 300 can be reduced.

The piezoelectric elements being the vibration parts 140 are not usually transparent. Thus, in the present embodiment, the vibration parts 140 are mounted outside the display surface 160a of the display panel 160 (in FIG. 7, outside the outer periphery of the display panel 160).

<Effects>

As described above, the electronic device 300 in the present embodiment includes: the display unit 165 including the touch panel 130 to be touched by the user, the display panel 160 having the display surface 160a on which to display information, and the first adhesive part 150 which is formed so as to cover the display surface 160a and which bonds the touch panel 130 and the display panel 160 together; the vibration parts 140 which cause flexural vibration of the display unit 165; and the second adhesive parts 155 which bond the vibration parts 140 to the display unit 165, and the rigidity of the first adhesive part 150 is lower than the rigidity of the second adhesive part 155.

Accordingly, vibration of the vibration parts 140 can be efficiently transmitted to the display unit 165, and the stress within the display unit 165 can be alleviated. Therefore, it is possible to provide an electronic device that is highly reliable with reduced uneven luminance and reduced uneven color, and that can present appropriate tactile sensation in accordance with a touch operation performed by the user.

Embodiment 3

Next, an electronic device 400 according to embodiment 3 will be described. The electronic device 400 according to the present embodiment is different from that of embodiment 1, in the positions at which the vibration parts 140 are bonded and in the number of the vibration parts 140. Hereinafter, the differences will be described.

Figure 8:
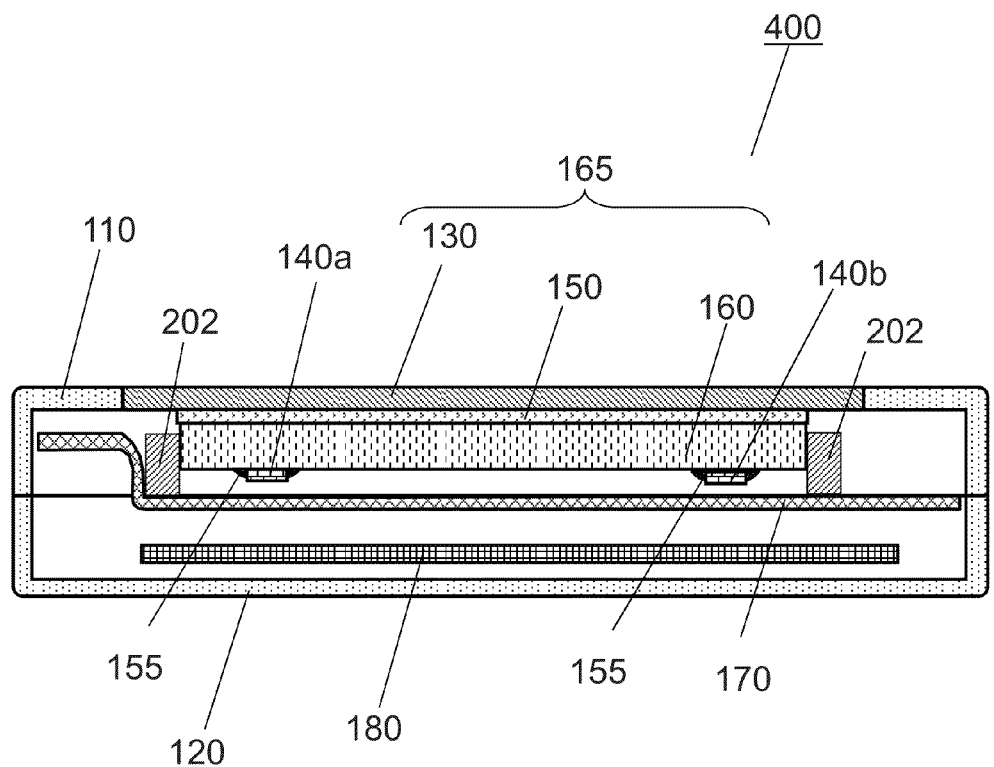
FIG. 8 is a cross-sectional view of an electronic device of embodiment 3.

FIG. 8 is a cross-sectional view of the electronic device 400 in the present embodiment. As shown in FIG. 8, two vibration parts 140a and 140b are arranged on the rear face of the display panel 160. By causing the plurality of the vibration parts 140a and 140b to vibrate in accordance with a touch position of the user, uniform vibration can be generated in the entirety of the touch panel 130.

In the present embodiment, when vibration of the vibration part 140a and vibration of the vibration part 140b are caused to resonate in the display unit 165, the display unit 165 will have positions at which the amplitude is large (anti-nodes of vibration of a standing wave) and positions at which the amplitude is small (nodes of vibration of the standing wave). In a case where the touch position of the user is a node portion of the vibration, the user is less likely to feel vibration of the display unit 165, and thus, information, i.e., vibration, may not be transferred to the user. Further, if the magnitude of vibration felt by the user is different depending on the touch position, the user may feel discomfort in operation. The electronic device 400 reduces the difference in tactile sensation at touch positions, by setting a vibration mode in accordance with a touch position.

Figure 9A:
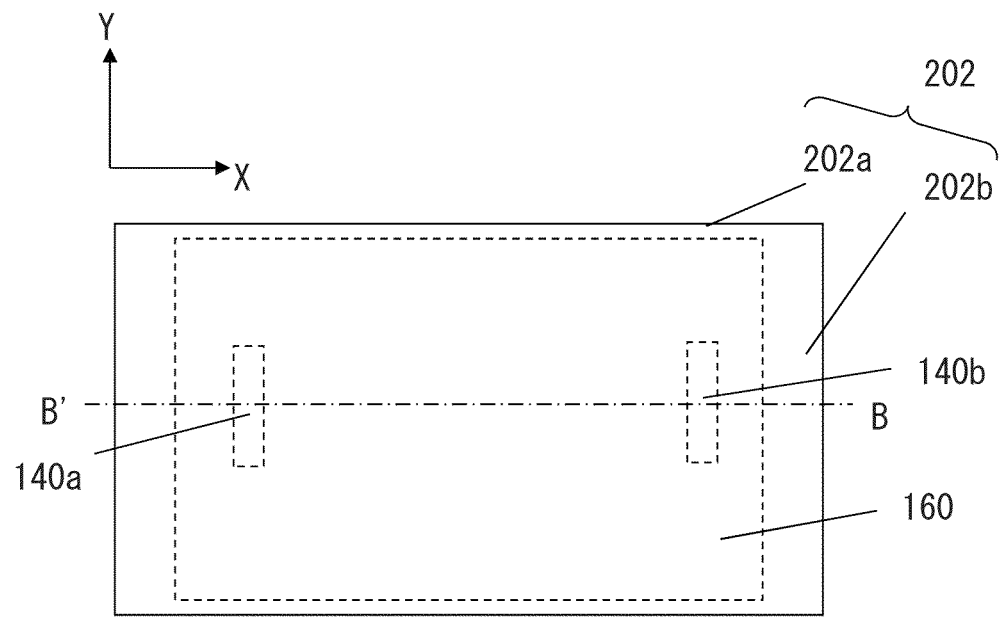
FIG. 9A is a plan view showing a display part of the electronic device of embodiment 3.

FIG. 9A is a plan view of the display panel 160 of the electronic device 400. The electronic device 400 includes, as a support part 202, a support part 202a extending in an X direction, and a support part 202b extending in a direction (Y direction) perpendicular to the support part 202a. In this example, the rigidity of the support part 202a in the X direction is lower than the rigidity of the support part 202b in the Y direction. In FIG. 9A, the cross-sectional area of the support part 202b is larger than the cross-sectional area of the support part 202a. In FIG. 8, although the support part 202 fixed to the frame 170 supports the outer periphery of the display unit 165, the upper housing 110 may support the outer periphery of the display unit 165 or may support the outer periphery of the touch panel 130.

The display panel 160 can be viewed by the user, via the transparent touch panel 130 and the transparent first adhesive part 150. The vibration parts 140a and 140b are bonded to the rear face of the display panel 160 via the second adhesive parts 155. Since the display panel 160 is not transparent, the vibration parts 140a and 140b are not visible by the user. In order to be able to efficiently induce a vibration mode that is used, the vibration parts 140a and 140b are arranged at places where the vibration amplitude becomes large in the vibration mode that is used.

Figure 9B:
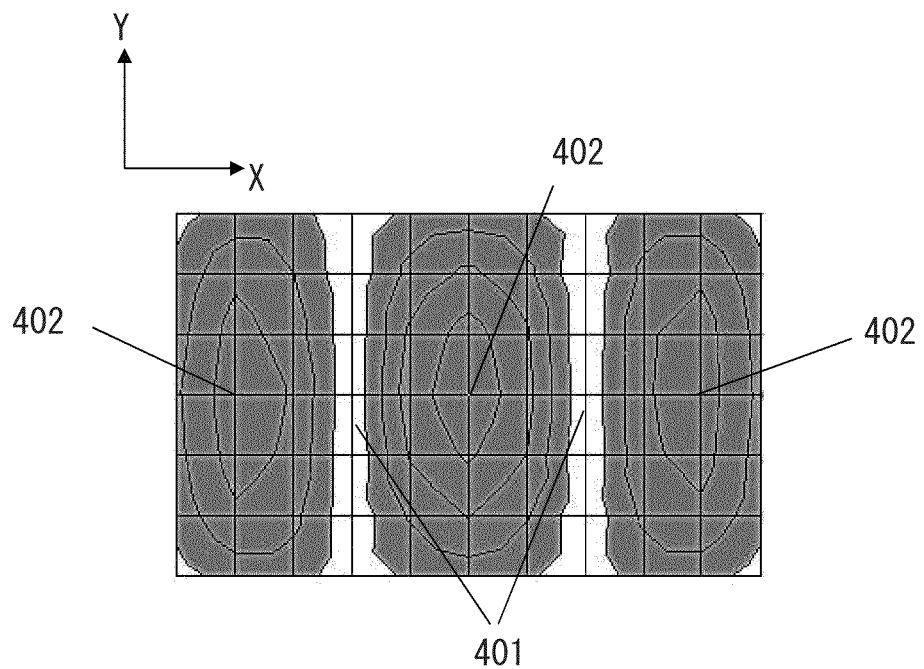
FIG. 9B is a distribution chart of the vibration amplitude of a touch panel when the vibration part of embodiment 3 is driven at a certain frequency.

FIG. 9B shows distribution of the vibration amplitude on the display unit 165 when a sine wave having a voltage of 150 Vpp and a frequency of 220 Hz is applied in same phase, via the vibration controller 141, to the piezoelectric elements of the vibration parts 140a and 140b. In FIG. 9B, the magnitude of the vibration amplitude is indicated by means of contours. This also applies to FIG. 9C and FIG. 9E. In the X direction, there are three positions having large amplitudes (hereinafter, vibration anti-nodes 402) and two positions having small amplitudes (hereinafter, vibration nodes 401) excluding both ends. In the Y direction, there is no vibration node 401 excluding both ends. This vibration mode will be referred to as f20 (in the digits attached to the right of "f", the first left digit represents the number of nodes in the X direction, and the second left digit represents the number of nodes in the Y direction). In the present embodiment, since the entire periphery of the display unit 165 is supported by the support part 202, flexural vibration with both ends fixed will occur in the display unit 165. It should be noted that vibration other than flexural vibration with both ends fixed may be used.

Figure 9C:
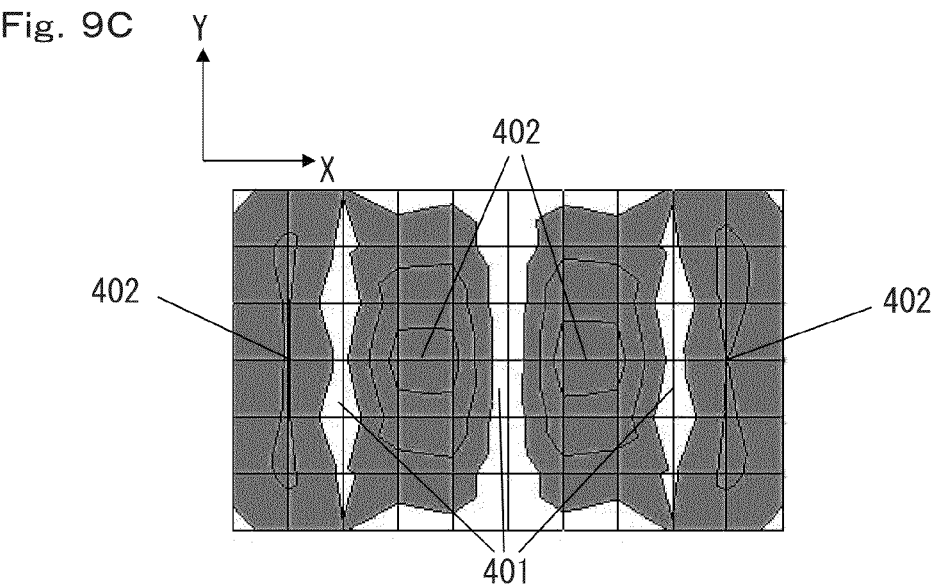
FIG. 9C is a distribution chart of the vibration amplitude of the touch panel when the vibration part of embodiment 3 is driven at a frequency different from the frequency used in FIG. 9B.

FIG. 9C shows distribution of the vibration amplitude on the display unit 165 when a sine wave having a voltage of 150 Vpp and a frequency of 370 Hz is applied in anti-phase, via the vibration controller 141, to the piezoelectric elements of the vibration parts 140a and 140b. Here, the anti-phase means that the phases of the drive voltage are controlled by the vibration controller 141 such that, for example, when the vibration part 140a expands, the vibration part 140b contracts. Specifically, the polarities of the voltage applied on the piezoelectric elements are reversed. In this case, in the X direction, four vibration anti-nodes 402 and three vibration nodes 401 occur. This vibration mode will be referred to as f30 mode.

The number of vibration nodes 401 occurring in the display unit 165 during vibration in the f20 mode (FIG. 9B), and the number of vibration nodes 401 occurring in the display unit 165 during vibration in the f30 mode (FIG. 9B) are different from each other. Accordingly, the positions of the nodes 401 on the display unit 165 in the f20 mode and the positions of the nodes 401 on the display unit 165 in the f30 mode are different from one another. Further, the positions of the vibration anti-nodes 402 occurring in the display unit 165 in the f20 mode and the positions of the vibration anti-nodes 402 occurring in the display unit 165 in the f30 mode are different from one another.

Figure 9D:
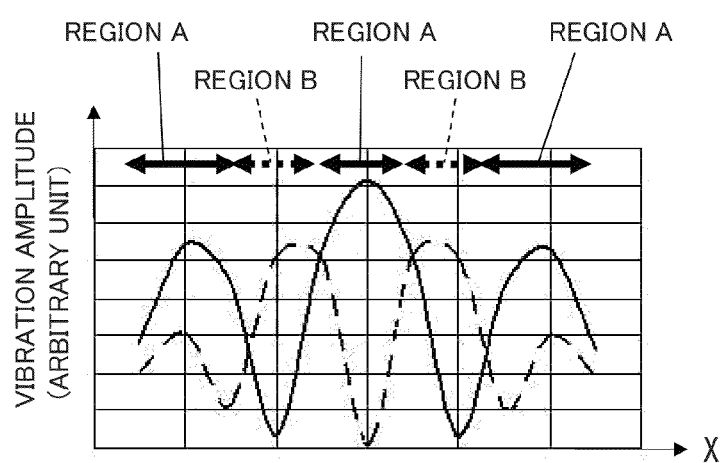
FIG. 9D shows the magnitude of vibration of the touch panel, taken along the B-B' line shown in FIG. 9A.

FIG. 9D shows magnitude distribution of the vibration amplitude on the touch panel 130, taken along the B-B' line shown in FIG. 9A. The solid line represents the magnitude of the vibration amplitude in the f20 mode (FIG. 9B), and the broken line represents the magnitude of the vibration amplitude in the f30 mode (FIG. 9C). In accordance with the touch position of the user, the vibration controller 141 controls the vibration waveform. Specifically, in a case where the touch position of the user is included in a region A shown in FIG. 9D, the vibration controller 141 controls the vibration waveform of the vibration part 140 such that the f20 mode is induced. In a case where the touch position of the user is included in a region B shown in FIG. 9D, the vibration controller 141 controls the vibration waveform such that the f30 mode is induced in the vibration part 140. The vibration controller 141 selects, from among the f20 mode and the f30 mode, a vibration mode in which a position that becomes a vibration node 401 is farther from the touch position of the user, to cause the display unit 165 to vibrate. It should be noted that the vibration controller 141 may select, from among the f20 mode and the f30 mode, a vibration mode in which a position that becomes a vibration anti-node 402 is closer to the touch position of the user, to cause the display unit 165 to vibrate. Through such control, the user can feel vibration, whichever position in the display unit 165 the user may touch.

Figure 9E:
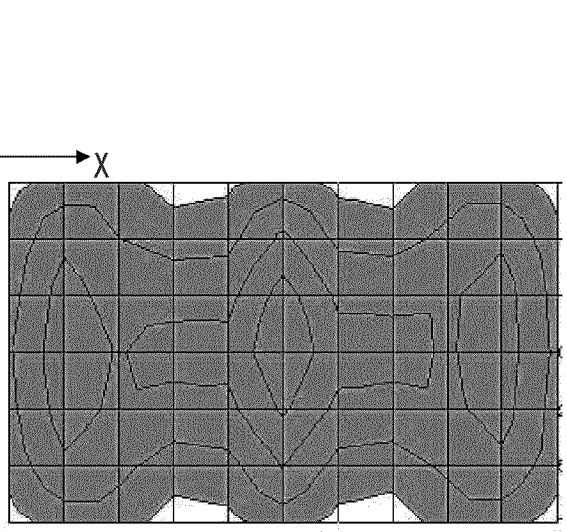
FIG. 9E is a distribution chart of the vibration amplitude of the touch panel when the drive frequency for the vibration part has been changed in accordance with a touch position, in the electronic device of embodiment 3.

FIG. 9E is a distribution chart of the vibration amplitude when specifications (drive frequency and the like) of the drive voltage are changed in accordance with the touch positions by the user. Since a drive voltage that can obtain, from among the f20 mode and the f30 mode, a vibration mode that makes vibration at the touch position of the user larger is outputted, the user can be provided with large amplitudes over the entire region of the display unit 165.

In the present embodiment, the number of vibration modes to be used is two. However, the present disclosure is not limited thereto. The number of vibration modes to be used may be two or more. In such a case, based on information of the touch position, a vibration mode that makes the amplitude at the touch position largest is selected from among the plurality of vibration modes, for example.

When selecting a vibration mode to be used, a frequency that not only presents uniformity of the vibration but also is more likely to be felt by a person and is less likely to generate sound may be selected. The frequency that a person can easily feel through tactile sensation is 100 to 500 Hz, more particularly, 200 to 400 Hz. When the frequency exceeds 500 Hz, noise may occur due to vibration of the panel. Therefore, a frequency not higher than 500 Hz, for example, not higher than 400 Hz, is used. Further, in a case where a plurality of vibration modes are used for different situations, if there are too great differences in drive frequencies among the vibration modes, the user feels discomfort through tactile sensation. Therefore, the differences in drive frequencies among the vibration modes may be small. If the voltage frequency and the voltage value are set such that the amplitude on the touch panel 130 becomes about 5 to 50 µm, tactile sensation (vibration) comfortable for a finger of a person can be presented.

The position, on the display panel 160, at which each vibration part 140 is arranged, may be at a position where the vibration amplitude of the display unit 165 becomes large in a vibration mode that is used. In the case of FIG. 9B, the vibration parts 140 may be arranged at three positions at which vibration anti-nodes will occur.

In the example of the present embodiment, the f20 mode and the f30 mode are used differently in accordance with touch positions. Thus, the vibration parts 140 are arranged near to positions of vibration anti-nodes in each of the f20 mode and the f30 mode. That is, the vibration parts 140 are arranged so as to be near to both of positions of anti-nodes when there are two vibration anti-nodes, and positions of anti-nodes when there are three vibration anti-nodes. In more detail, the vibration parts 140 are arranged at positions near to vibration anti-nodes in each of the f20 mode and the f30 mode, than to vibration nodes in each of the f20 mode and the f30 mode. From the viewpoint of costs, it is desired to generate vibration using a smallest possible number of the vibration parts 140. Therefore, the vibration parts 140 are arranged in a middle portion in the Y direction where the vibration amplitude becomes large in both vibration modes (arrangement shown in FIG. 9A). Specifically, in the example of the present embodiment, vibration anti-nodes in the f20 mode are at positions, from the rightmost of the display panel 160 (the display unit 165) shown in FIG. 9A, about 10%, about 50%, and about 90% of the length in the X direction. On the other hand, vibration anti-nodes in the f30 mode are at positions, similarly from the rightmost of the display panel 160 shown in FIG. 9A, about 10%, about 35%, about 65%, and about 90% of the length in the X direction. Therefore, the vibration parts 140 are arranged at positions about 10% and about 90% that are near to the anti-nodes in both modes. Further, there is no problem with arranging the vibration parts 140 at positions about 40% and about 60%.

Table 1 shows drive conditions in accordance with touch positions.

TABLE 1

| Drive Condition | Condition A | Condition B |
|---|---|---|
| Touch Position | Region A | Region B |
| Frequency | 220 Hz | 370 Hz |
| Burst Interval | 250 ms | 250 ms |
| Number of Waves | 5 | 9 |
| Voltage | 150 V | 150 V |
| Phase | In same phase | Anti-phase |

The user touches the touch panel 130. A microcomputer (not shown) refers to values shown in Table 1 in accordance with a touch position, selects a drive condition such that uniform tactile sensation is presented to the user, and sends the drive condition to the vibration controller 141. The drive condition includes at least one of drive voltage, drive frequency, phase, waveform, output timing, and the like for each of the vibration parts 140a and 140b. Based on the information from the microcomputer, the vibration controller 141 drives the vibration part 140, to present tactile sensation to the user. Specifically, in a case where the touch position is in the region A shown in FIG. 9D, the vibration part 140 is driven on the condition A, and in a case where the touch position is in the region B, the vibration part 140 is driven on the condition B.

The example of the present embodiment is configured to have a least number of places where the vibration part 140 is set. However, the vibration part 140 may be set at two or more places. Further, although the vibration parts 140 are arranged in the middle portion in the Y direction in end portions in the X direction, the vibration parts 140 may be arranged at a middle portion in the X direction in end portions in the Y direction, or alternatively, the vibration parts 140 may be arranged at both of them. Further, although the vibration parts 140 are arranged at positions in symmetry relative to the center in the X direction of the display panel 160, the vibration parts 140 may be arranged at positions not in symmetry relative to the center in the X direction of the display panel 160. In such a case, it is sufficient that the vibration parts 140 are arranged at positions near to vibration anti-nodes in a vibration mode to be generated.

Further, as shown in FIG. 9C, in a case where vibrations (longitudinal vibration) in anti-phase are induced in two vibration parts 140, not the positions at which to arrange the vibration parts 140 but the phases of the drive voltages that drive the respective vibration parts 140 need to be changed. Specifically, as shown in FIG. 9C, in a case where the vibration parts 140 are arranged at left and right in the X direction of the display panel 160, the drive voltages to the respective vibration parts 140 are caused to be in anti-phase in the left and right vibration parts 140 (such that when one vibration part 140 expands, the other vibration part 140 contracts).

As each vibration part 140, a transparent thin film piezoelectric member formed on a surface of the display unit 165 by a sputtering method or the like may be used. Further, in a case where a cover member is provided on the display unit 165, the vibration part 140 may be affixed to the cover member. In the case where a cover member is provided on the display unit 165, both the display unit 165 and the cover member are collectively referred to as a panel member which detects a touch position.

<Effects>

As described above, the electronic device 400 in the present embodiment includes: the display unit 165 including the display panel 160 having a display region on which to display information, the touch panel 130 to be touched by the user, the first adhesive part 150 which is formed so as to cover the display region and which bonds the touch panel 130 and the display panel 160 together; the vibration parts 140 which cause flexural vibration of the display unit 165; and the second adhesive part 155 which bonds the vibration part 140 to the display unit 165, and the rigidity of the first adhesive part 150 is lower than the rigidity of the second adhesive part 155. The vibration part 140 is arranged at a position nearer to an anti-node than a node of vibration.

Accordingly, the vibration part 140 can efficiently cause the display unit 165 to vibrate. As a result, appropriate tactile sensation can be presented to the user.

Further, in the present embodiment, a plurality of the vibration parts 140a and 140b are bonded to the display unit 165, and the electronic device 400 further includes the vibration controller 141 which controls drive of a plurality of the vibration parts 140a and 140b, by selecting a drive condition, from among a plurality of drive conditions including a first drive condition for causing vibration of a first vibration mode to be generated in the touch panel 130 and a second drive condition for causing vibration of a second vibration mode to be generated in the touch panel 130. Further, the number of nodes of the vibration generated in the touch panel 130 in the first vibration mode and the number of nodes of the vibration generated in the touch panel 130 in the second vibration mode are different from each other.

Accordingly, uniform vibration can be generated in the entirety of the display unit 165. Therefore, tactile sensation appropriate for the user can be presented in the entirety of the display unit 165.

Further, in the present embodiment, when the number of nodes in the first vibration mode is defined as N (N is a positive integer), the number of nodes in the second vibration mode is N+1.

Therefore, the positions of nodes in the first vibration mode and the positions of nodes in the second vibration mode do not overlap each other, and the difference in frequencies in the first vibration mode and in the second vibration mode becomes smallest. Thus, tactile sensation appropriate for the user can be presented in the entirety of the display unit 165.

Further, in the present embodiment, the electronic device 400 further includes the touch panel controller 131 which detects a touch position of the user, and the vibration controller 141 performs switching between the first vibration mode and the second vibration mode in accordance with a detection result of a touch position obtained by the touch panel controller 131.

Accordingly, sufficient vibration can be generated at the touch position of the user. Therefore, tactile sensation appropriate for the user can be presented in the entirety of the display unit 165.

Other Embodiments

As presented above, embodiments 1 to 3 have been described as examples of the technology disclosed in the present application. However, the technology in the present disclosure is not limited thereto, and can be applied to embodiments in which modifications, replacements, additions, and omissions are made as appropriate. A new embodiment can be made by combining various components described in embodiments 1 to 3 above.

Hereinafter, other embodiments will be described as examples.

In embodiments 1 to 3, description has been given of the touch panel 130 and the upper housing 110 (210) in a case where the first adhesive part 150 is an adhesive. However, the first adhesive part 150 may not itself have adhesiveness as an adhesive. For example, a pressing member for pressing the first adhesive part 150 is provided to the frame 170, and the first adhesive part 150 is sandwiched by this pressing member and the upper housing 110, to bring the first adhesive part 150 into contact with the touch panel 130 under pressure. Further, the first adhesive part 150 may be brought into contact with the touch panel 130 under pressure, by using a cushion member such as silicone rubber, polyurethane rubber, or the like between the display panel 160 and the frame 170.

With respect to embodiments 1 to 3, the vibration part 140 is arranged behind the display panel 160 in embodiment 1, and the vibration part 140 is arranged on the touch panel 130 in embodiment 2. However, the vibration part 140 need not be directly connected to the display unit 165. As long as the vibration part 140 can cause the display unit 165 to vibrate, the vibration part 140 may be connected to a member other than the display unit 165.

In embodiments 1 to 3, the touch panel 130 has been described using an exemplary panel member that is touched by the user and that also has a function of sensing a touch position. However, the member to be touched by the user and the member having the function of sensing the touch position may be separate members. A so-called in-cell technology or on-cell technology can be used in which a protection glass (panel member) to be touched by the user is provided on the display panel 160 and a sensor which senses a touch position is embedded on a surface of the display panel 160 or embedded in the display panel 160. Even when these technologies are used, the same effects as those obtained in the embodiments above can be obtained.

In embodiments 1 to 3, each adhesive part has been described using an example in which bonding is performed by using resin. However, another bonding method may be used for the bonding. Further, the second adhesive part 155 has been described using an example in which side faces and a rear face of the vibration part 140 are bonded to the display unit 165. However, the second adhesive part 155 may bond the vibration part 140 at positions other than those, i.e., for example, at only side faces thereof or at only the rear face thereof.

As presented above, embodiments have been described as examples of the technology according to the present disclosure. For this purpose, the accompanying drawings and the detailed description are provided.

Therefore, components in the accompanying drawings and the detailed description may include not only components essential for solving problems, but also components that are provided to illustrate the above described technology and are not essential for solving problems. Therefore, such inessential components should not be readily construed as being essential based on the fact that such inessential components are shown in the accompanying drawings or mentioned in the detailed description.

Further, the above described embodiments have been described to exemplify the technology according to the present disclosure, and therefore, various modifications, replacements, additions, and omissions may he made within the scope of the claims and the scope of the equivalents thereof.

What is claimed is:

1. An electronic device comprising:
    a display unit including a display part having a display region on which to display an image, a panel member to be touched by a user, and a first adhesive part provided so as to cover the display region and bonding the panel member and the display part together;
    a vibration part configured to cause flexural vibration of the display unit; and
    a second adhesive part bonding the vibration part to the display unit, wherein rigidity of the first adhesive part is lower than rigidity of the second adhesive part and is set to suppress an occurrence of uneven luminance and uneven color of the display part caused by the display part receiving a stress caused by a stress occurring in the first adhesive part.

2. The electronic device according to claim 1, wherein the first adhesive part bonds the panel member and the display part together, for substantially an entirety of a region where the panel member and the display part face each other.

3. The electronic device according to claim 1, wherein the rigidity of the first adhesive part is lower than rigidity of the panel member.

4. The electronic device according to claim 1, wherein the vibration part is bonded to the display part, on an opposite side to the panel member.

5. The electronic device according to claim 1, wherein the vibration part is arranged nearer to a position that becomes an anti-node of vibration than a position that becomes a node of vibration in the display unit.

6. The electronic device according to claim 1, wherein a plurality of the vibration parts are bonded to the display unit,
    the electronic device further includes:
        a vibration controller configured to control drive of the plurality of the vibration parts, by selecting a drive condition from among a plurality of drive conditions including a first drive condition for causing vibration of a first vibration mode in the panel member and a second drive condition for causing vibration of a second vibration mode in the panel member, and
    the number of nodes of the vibration generated in the panel member in the first vibration mode and the number of nodes of the vibration generated in the panel member in the second vibration mode are different from each other.

7. The electronic device according to claim 6, wherein when the number of the nodes in the first vibration mode is defined as N (N is a positive integer), the number of the nodes in the second vibration mode is N+1.

8. The electronic device according to claim 6, further including:
    a panel controller configured to detect a touch position of the user, wherein
    the vibration controller performs switching between the first vibration mode and the second vibration mode in accordance with a detection result of the touch position obtained by the panel controller.

9. The electronic device according to claim 1, wherein the first adhesive part is formed from a material that allows light emitted from the display part to pass therethrough.

10. The electronic device according to claim 1, wherein the second adhesive part is provided between the vibration part and the display unit.

* * * * *